United States Patent
Jordan et al.

(10) Patent No.: US 12,112,369 B2
(45) Date of Patent: Oct. 8, 2024

(54) TRANSMITTING PROACTIVE NOTIFICATIONS BASED ON MACHINE LEARNING MODEL PREDICTIONS

(71) Applicant: Capital One Services, LLC, McLean, VA (US)

(72) Inventors: Stephen Jordan, Burke, VA (US); Brad Giska, Richmond, VA (US); Marisa Lee, Washington, DC (US); Erik Virbitsky, Washington, DC (US); Sean Easter, White Bear Lake, MN (US); James Ricks, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/302,957

(22) Filed: May 17, 2021

(65) Prior Publication Data
US 2022/0366488 A1    Nov. 17, 2022

(51) Int. Cl.
| | |
|---|---|
| *G06Q 40/02* | (2023.01) |
| *G06N 5/04* | (2023.01) |
| *G06N 20/00* | (2019.01) |
| *G06Q 20/10* | (2012.01) |
| *G06Q 20/34* | (2012.01) |
| *G06Q 20/40* | (2012.01) |

(52) U.S. Cl.
CPC ............... *G06Q 40/02* (2013.01); *G06N 5/04* (2013.01); *G06N 20/00* (2019.01); *G06Q 20/108* (2013.01); *G06Q 20/354* (2013.01); *G06Q 20/4037* (2013.01); *G06Q 20/405* (2013.01)

(58) Field of Classification Search
CPC .... G06Q 40/02; G06Q 20/108; G06Q 20/354; G06Q 20/4037; G06Q 20/405; G06N 20/00; G06N 5/04

USPC ............................................................. 705/42
See application file for complete search history.

(56) References Cited

U.S. PATENT DOCUMENTS

| | | | | |
|---|---|---|---|---|
| 2002/0022966 | A1* | 2/2002 | Horgan ................. | G06Q 20/02 705/35 |
| 2006/0293983 | A1* | 12/2006 | Rosenblatt ............ | G06Q 40/00 235/380 |
| 2007/0045403 | A1* | 3/2007 | Slonecker, Jr. ....... | G06Q 20/354 235/380 |
| 2016/0300199 | A1* | 10/2016 | Guido ................... | G06Q 20/10 |
| 2018/0040064 | A1* | 2/2018 | Grigg ................... | H04L 41/145 |

(Continued)

*Primary Examiner* — Jessica Lemieux
*Assistant Examiner* — Merritt J Hasbrouck
(74) *Attorney, Agent, or Firm* — Harrity & Harrity, LLP

(57) ABSTRACT

A system may identify, using a machine learning model, a series of recurring events associated with an account and may generate, using the machine learning model, a prediction of a future date on which a predicted event, associated with the series of recurring events, is to occur. The system may determine that a condition associated with the account is satisfied and may determine that a current date is within a threshold number of days of the future date based on the prediction of the future date. The system may transmit, to a user device, a notification based on determining that the current date is within the threshold number of days of the future date and that the condition associated with the account is satisfied, wherein the notification includes information for presentation of an input element that enables an action to be performed in connection with the account.

20 Claims, 7 Drawing Sheets

(56) References Cited

U.S. PATENT DOCUMENTS

2019/0259095 A1* 8/2019 Templeton .............. G06N 3/08
2019/0378112 A1* 12/2019 Grassadonia .......... G06Q 40/00
2020/0265439 A1* 8/2020 Potabathula ....... G06Q 20/4037

* cited by examiner

TRANSMITTING PROACTIVE NOTIFICATIONS BASED ON MACHINE LEARNING MODEL PREDICTIONS

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

SUMMARY

In some implementations, a system for transmitting proactive notifications based on machine learning model predictions includes one or more memories; and one or more processors, communicatively coupled to the one or more memories, configured to: identify, using a machine learning model, a series of recurring events associated with an account of a user; generate, using the machine learning model, a prediction of a future date on which a predicted event, associated with the series of recurring events, is to occur; determine, using the machine learning model, a predicted amount associated with the predicted event in connection with the future date; determine that a current date is within a threshold number of days of the future date based on the prediction of the future date; determine that a current balance, associated with the account, is within a threshold amount of a limit associated with the account, wherein the threshold amount is based on the predicted amount associated with the predicted event; and transmit, to a user device associated with the user, a notification based on determining that the current date is within the threshold number of days of the future date and that the current balance is within the threshold amount of the limit associated with the account.

In some implementations, a method for transmitting proactive notifications based on one or more machine learning predictions includes identifying, by a system and using a machine learning model, a series of recurring events associated with an account of a user; generating, by the system and using the machine learning model, a prediction of a future date on which a predicted event, associated with the series of recurring events, is to occur; determining, by the system, that a condition associated with the account is satisfied; determining, by the system, that a current date is within a threshold number of days of the future date based on the prediction of the future date; and transmitting, by the system and to a user device associated with the user, a notification based on determining that the current date is within the threshold number of days of the future date and that the condition associated with the account is satisfied, wherein the notification includes information for presentation of an input element that enables an action to be performed in connection with the account.

In some implementations, a non-transitory computer-readable medium storing a set of instructions for transmitting proactive notifications based on one or more predictions includes one or more instructions that, when executed by one or more processors of a system, cause the system to: identify a series of recurring events associated with an account of a user; generate a prediction of a future date on which a predicted event, associated with the series of recurring events, is to occur; determine that a condition associated with the account is satisfied; determine that a current date is within a threshold number of days of the future date based on the prediction of the future date; and transmit, to a user device associated with the user, a notification based on determining that the current date is within the threshold number of days of the future date and that the condition associated with the account is satisfied, wherein the notification includes information for presentation of an input element that enables an action to be performed in connection with the account.

DETAILED DESCRIPTION

Figure 1A:
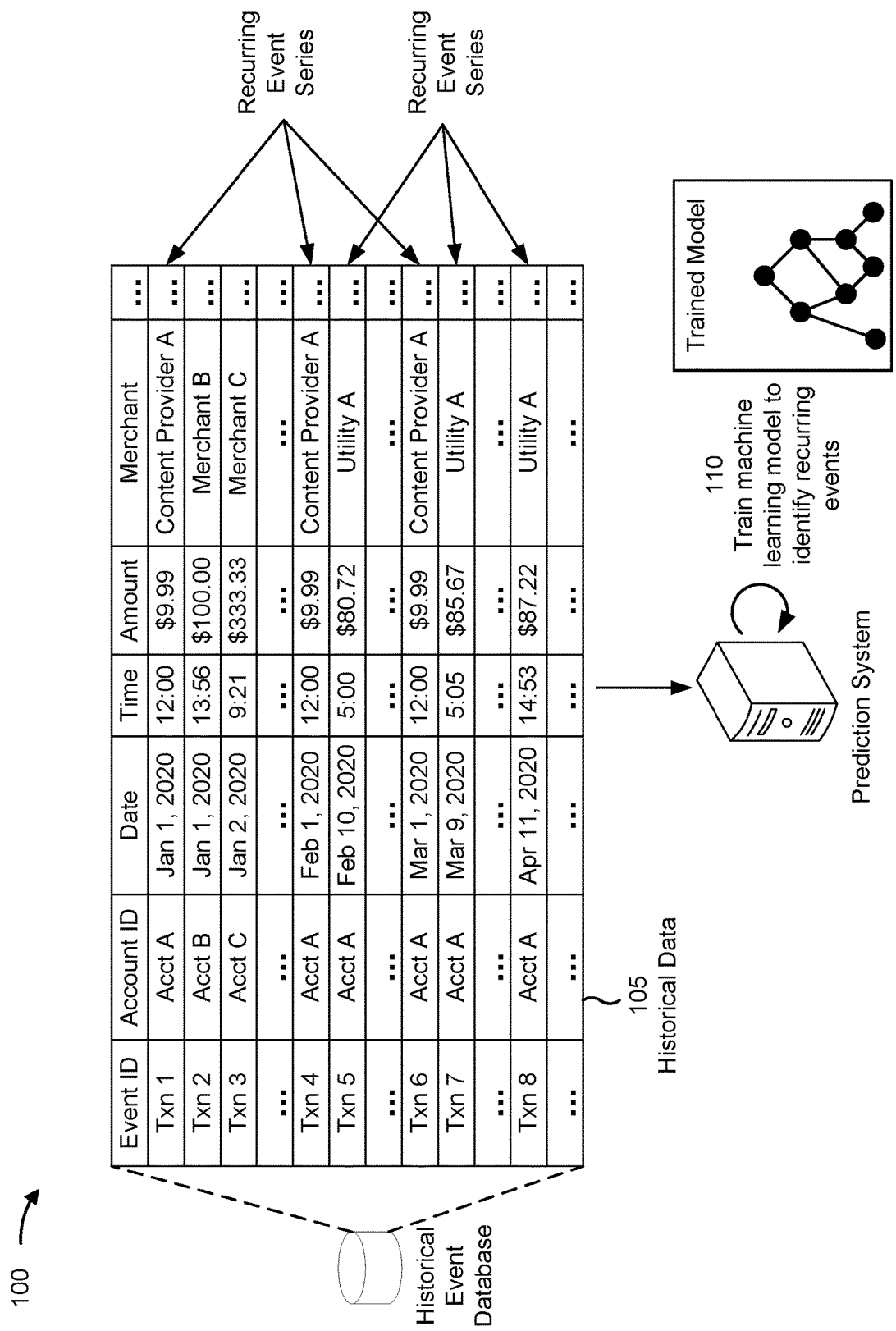
FIGS. 1A-1C are diagrams of an example implementation relating to transmitting proactive notifications based on machine learning model predictions.

The following detailed description of example implementations refers to the accompanying drawings. The same reference numbers in different drawings may identify the same or similar elements.

An entity (e.g., a company, an organization, or an institution, among other examples) may track events associated with accounts of a plurality of users (e.g., thousands of users, tens of thousands of users, hundreds of thousands of users, or millions of users) that are associated with the entity. For example, the entity may store and maintain transaction events associated with financial accounts (e.g., credit accounts) of the plurality of users in a database. Accordingly, the entity may track a multitude (e.g., thousands, millions, or billions) of events a year.

Often, a user's account may be associated with a series of recurring events, such as a series of recurring transaction events (e.g., payments of a bill on a regular basis). In some cases, a current balance of the account may be close to a limit associated with the account (e.g., a credit limit or an authorized user limit of the account) and the account may have insufficient funds (or credit) to successfully execute a transaction event of the series of recurring transaction events (e.g., executing the transaction event would cause the current balance of the account to exceed the limit associated with the account). Accordingly, the transaction event may be declined (e.g., by the entity) when execution of the transaction event is attempted (e.g., when an automatic charge to a transaction card associated with the account is attempted). Accordingly, the entity may consume computing resources (e.g., processing resources, memory resources, communication resources, and/or power resources, among other examples) associated with attempting to execute the transaction event, declining the transaction event, updating a database to indicate that the transaction event was declined, notifying the user that the transaction event was declined, and/or providing instructions or other resources to the user on how to increase an availability of funds (or credit) of the account, among other examples.

Some implementations described herein provide a prediction system that uses a machine learning model to identify a series of recurring events associated with an account of a user and to generate a prediction of a future date on which a predicted event, associated with the series of recurring events, is to occur. The prediction system may determine, based on the prediction, that a condition (e.g., an over credit limit condition or an over authorized user limit condition, among other examples) associated with the account is satisfied. For example, the prediction system may determine that the account may exceed a limit of the account on the future date if the predicted event is executed. In some implementations, the prediction system may determine that a current date is within a threshold number of days of the future date based on the prediction of the future date and may transmit, to a user device associated with the user, a notification. For example, the prediction system may determine that the predicted event is to occur in three days and therefore the prediction system may send a notification to the user device of the user. The notification may indicate the prediction and/or the satisfied condition (e.g., that the account may exceed the limit of the account on the future date if the predicted event is executed). In some implementations, the notification may include information for presentation of an input element that enables (e.g., when the user interacts with the input element via the user device) an action to performed in connection with the account, such as a transfer of funds to the account or a request to increase the limit of the account.

In this way, the prediction system facilitates a reduction of a current balance (e.g., a current credit balance) of the account and/or an increase to the limit of the account. This may increase a likelihood that the account has sufficient funds (or credit) to successfully execute the predicted event on the predicted future date. Accordingly, the prediction system reduces consumption of computing resources (e.g., processing resources, memory resources, communication resources, and/or power resources, among other examples) to attempt to execute a transaction event (e.g., that is likely to be declined), to decline the transaction event, to update a database to indicate that the transaction event was declined, to notify the user that the transaction event was declined, and/or to provide instructions or other resources to the user on how to increase an availability of funds (or credit) of the account, among other examples.

Further, the prediction system is able to provide the same functionality for multiple accounts (e.g., thousands, tens of thousands, hundreds of thousands, or millions of accounts) of an entity. Accordingly, the prediction system transmits proactive notifications, based on machine learning model predictions, that enable multiple actions (e.g., thousands, tens of thousands, hundreds of thousands, or millions of accounts) to be proactively performed that would not otherwise be proactively performed. This reduces a likelihood that the multiple accounts will avoid encountering declined transaction events and therefore consumption of computing resources associated with facilitating transaction events of the multiple accounts may be reduced.

Figure 1B:
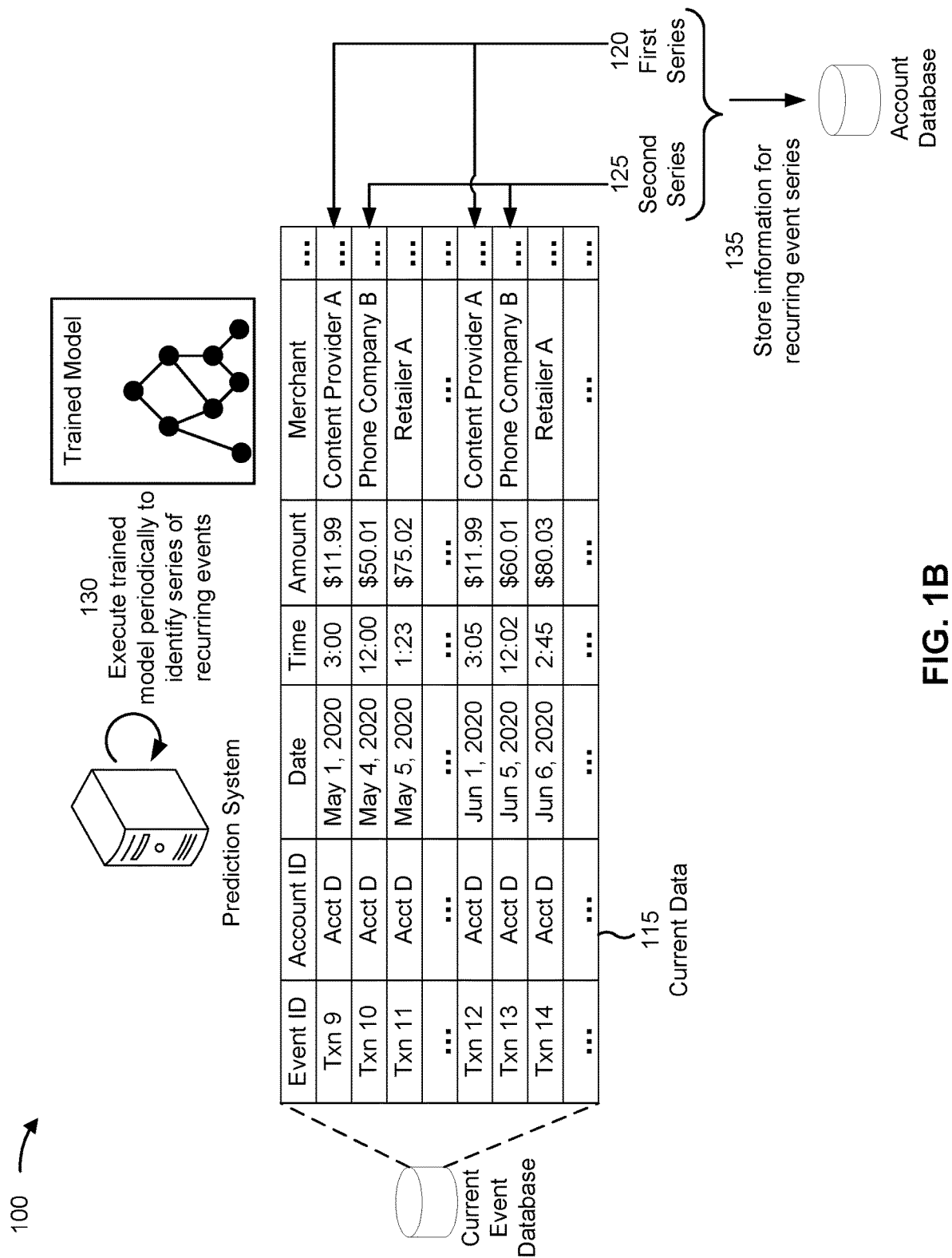
Figure 1C:
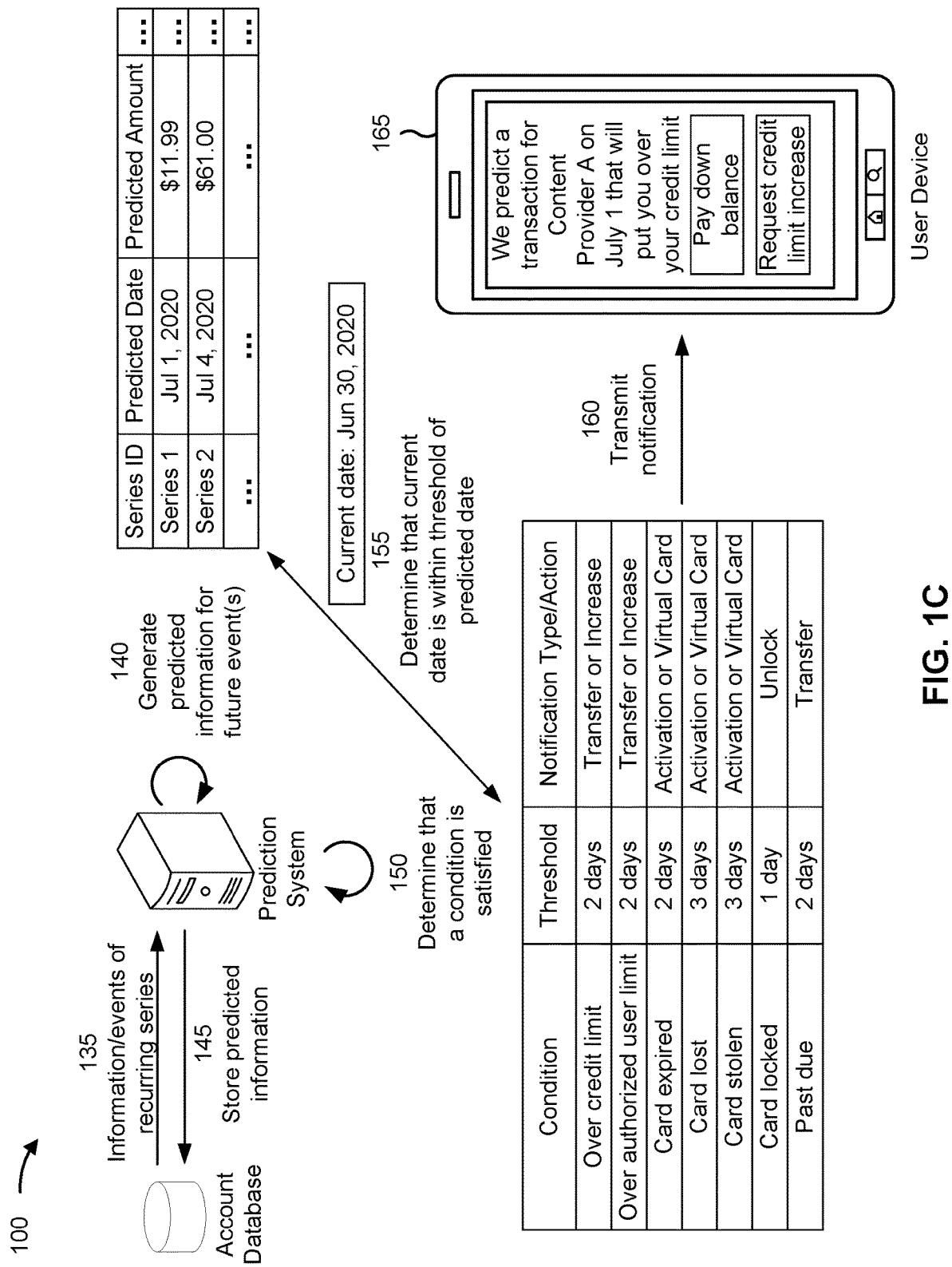

FIGS. 1A-1C are diagrams of an example 100 associated with transmitting proactive notifications based on machine learning model predictions. As shown in FIGS. 1A-1C, example 100 includes a prediction system, a user device, and a plurality of databases (e.g., a historical event database, an event database, and/or one or more account databases, which may be included in a storage system). These devices are described in more detail in connection with FIGS. 3 and 4.

As shown in FIG. 1A, the historical event database may store historical data 105. The historical data may include one or more entries respectively associated with one or more events (e.g., one or more historical events). An event may be an action that occurred at a particular time. For example, an event may be a transaction associated with an account (e.g., a financial account, such as a checking account, or a non-financial account, such as a social media account, a media streaming service account, or an electronic messaging account, among other examples) at a particular time. Accordingly, an entry associated with an event may include one or more details associated with the event. For example, as shown in FIG. 1A, when the event is associated with a transaction of a financial account, the entry may indicate an event identifier (e.g., a transaction identifier) (shown as Event ID), a transaction account identifier (shown as Account ID), a transaction date indicator (shown as Date), a transaction time indicator (shown as Time), a transaction amount indicator (shown as Amount), and/or a transaction merchant identifier (shown as Merchant), among other examples. In this way, the historical data 105 may include entries associated with many different events.

As further shown in FIG. 1A, the historical data 105 may include one or more sets of entries respectively associated with one or more series of recurring events. A recurring event may be an event that occurred on a recurring basis (e.g., daily, weekly, monthly, semiannually, or annually, among other examples). For example, as shown in FIG. 1A, the historical data 105 may include a first set of entries associated with a first series of recurring events that are associated with an account that has a transaction account identifier of Acct A and a merchant that has a transaction merchant identifier of Content Provider A (e.g., entries with event identifiers Txn 1, Txn 4, and Txn 6). The first set of entries indicate that the first series of recurring events were associated with transaction amounts of $9.99 and occurred monthly on the first of the month (e.g., on Jan. 1, 2020, Feb. 1, 2020, and Mar. 1, 2020) at the same time (e.g., 12:00 PM). As another example, as further shown in FIG. 1A, the historical data 105 may include a second set of entries associated with a second series of recurring events associated with the account that has a transaction account identifier of Acct A and a merchant that has a transaction merchant identifier of Utility A (e.g., entries with event identifiers Txn 5, Txn 7, and Txn 8). The second set of entries indicate that the second series of recurring events were associated with different transaction amounts (e.g., $80.72, $85.67, and $87.22) and occurred monthly on different dates and times (e.g., on Feb. 10, 2020 at 5:00 AM; Mar. 9, 2020 at 5:05 AM; and Apr. 11, 2020 at 2:53 PM). While these examples are associated with series of recurring events that are associated with a single account (e.g., that has the account identifier of Acct A), the historical data 105 may include series of recurring events associated with multiple different accounts (e.g. that are associated with multiple different users and/or of a single user).

In some implementations, the prediction system may communicate with the historical event database to access and/or to obtain the historical data 105. As further shown in FIG. 1A, and by reference number 110, the prediction system may train a machine learning model to identify recurring events (e.g., based on the historical data 105). In some implementations, the prediction system may train the machine learning model based on information included in the one or more entries (e.g., that are respectively associated with one or more events) of the historical data 105 and/or additional information, such as indications of sets of entries, of the one or more entries, that are respectively associated with series of recurring events; statistical information associated with the series of recurring events (e.g., an average time between events included in a series of recurring events, a standard deviation determined for times between events included in a series of recurring events, an average transaction amount associated with a series of recurring events, and/or a standard deviation determined for transaction amounts of a series of recurring events); and/or confidence scores that respectively indicate a confidence level that a set of entries is associated with a series of recurring events. Using the historical data 105 and/or the additional information as inputs to the machine learning model, the prediction system may determine a confidence score that an entry is associated with a recurring event and/or that a set of entries is associated with a series of recurring events. In this way, the prediction system may train the machine learning model to identify a series of recurring events (e.g., that are associated with an account). In some implementations, the machine learning model may be trained and/or used in a manner similar to that described below with respect to FIG. 2.

As shown in FIG. 1B, the event database may store current data 115. The current data 115 may include one or more entries respectively associated with one or more events (e.g., one or more current events) that are not included in the historical data 105 (e.g., one or more entries that have not been archived or otherwise moved from the event database to the historical database). In some implementations, an entry of the current data 115 may include elements that are the same as, or similar to, elements of an entry of the historical data 105. For example, as shown in FIG. 1B, when an event is associated with a transaction of a financial account, an entry of the current data 115 that is associated with the event may include the same or similar elements as an entry of the historical data 105 that is associated with a transaction of a financial account. In some implementations, the current data 115 may include entries associated with many different events (e.g., that are associated with different accounts and/or merchants).

In some implementations, the current data 115 may include one or more sets of entries respectively associated with one or more series of recurring events. For example, as shown in FIG. 1B, the current data 115 may include a plurality of entries that are associated with an account that has a transaction account identifier of Acct D (e.g., entries with event identifiers Txn 9 through 14). The current data 115 may include a first set of entries, of the plurality of entries, associated with a first series of recurring events 120 that are associated with a merchant that has a transaction merchant identifier of Content Provider A and a second set of entries associated with a second series of recurring events 125 that are associated with a merchant that has a transaction merchant identifier of Phone Company B. The first set of entries (e.g., entries with event identifiers Txn 9 and Txn 12) indicate that the first series of recurring events were associated with transaction amounts of $11.99 and occurred monthly on the first of the month (e.g., on May 1, 2020 and Jun. 1, 2020) and at similar times (e.g., 3:00 AM and 3:05 AM). The second set of entries (e.g., entries with event identifiers Txn 10 and Txn 13) indicate that the second series of recurring events were associated with different transaction amounts ($50.01 and $60.01) and occurred monthly on different dates and times (e.g., on May 4, 2020 at 12:00 PM and Jun. 5, 2020 at 12:02 PM). While these examples are associated with series of recurring events that are associated with a single account (e.g., that has the account identifier of Acct D), the current data 115 may include series of recurring events associated with multiple different accounts (e.g. that are associated with multiple different users).

In some implementations, the prediction system may communicate with the current event database to access and/or to obtain the current data 115. The prediction system may process the current data 115 to identify a series of recurring events (e.g., that are associated with an account). For example, as shown in FIG. 1B, and by reference number 130, the prediction system may execute the machine learning model (e.g., that was trained as described in relation to FIG. 1A and/or FIG. 2) to identify a series of recurring events in the current data 115. The prediction system may provide the current data 115 as input to the machine learning model and the machine learning model may identify the first set of entries that are associated with the first series of recurring events 120 (e.g., that are associated with Acct D) and/or the second set of entries that are associated with the second series of recurring events 125 (e.g., that are associated with Acct D). In some implementations, the prediction system may periodically (e.g., every 30 minutes, 2 hours, 12 hours, or 24 hours, among other examples) execute the machine learning model. In this way, the prediction system may timely identify a series of recurring events that are associated with an account (e.g., of a user).

As further shown in FIG. 1B, and by reference number 135, the prediction system may store information relating to one or more series of recurring events that are associated with an account (e.g., that was identified by the prediction system) in an account database associated with the account. For example, the prediction system may store, in an account database associated with Acct D, the first set of entries of the current data 115 that are associated with the first series of recurring events 120 and/or the second set of entries of the current data 115 that are associated with the second series of recurring events 125.

As shown in FIG. 1C, and by reference number 135, the prediction system may communicate with an account database that is associated with an account to access and/or to obtain information relating to one or more series of recurring events that are associated with the account. For example, the prediction system may communicate with an account database that is associated with Acct D to access and/or to obtain the first set of entries of the current data 115 that are associated with the first series of recurring events 120 and/or the second set of entries of the current data 115 that are associated with the second series of recurring events 125 (e.g., that were identified by the prediction system, as described herein in relation to FIG. 1B and reference number 130).

As further shown in FIG. 1C, and by reference number 140, the prediction system may generate predicted information for one or more future events for the account (e.g., based on the information relating to one or more series of recurring events that are associated with the account). In some implementations, the prediction system may provide the information relating to one or more series of recurring events that are associated with the account to the machine learning model (e.g., that was trained as described in relation to FIG. 1A and/or FIG. 2 and/or that was used to identify a series of recurring event as described in relation to FIG. 1B) and may execute the machine learning model to generate a predicted future date (e.g., a prediction of a future date on which a predicted event, associated with a series of recurring events, is to occur) and/or a predicted amount (e.g., that is associated with the predicted event in connection with the future date). For example, as shown in FIG. 1C, the prediction system may use the machine learning model to process the first set of entries of the current data 115 that are associated with the first series of recurring events 120 to generate a first prediction of a first predicted future date (e.g., Jul. 1, 2020) on which a first predicted event (e.g., a transaction), associated with the first series of recurring events 120 (Series 1), is to occur and/or a first predicted amount (e.g., a transaction amount of $11.99) associated with the first predicted event. As another example, as further shown in FIG. 1C, the prediction system may use the machine learning model to process the second set of entries of the current data 115 that are associated with the second series of recurring events 125 to generate a second prediction of a second predicted future date (e.g., Jul. 4, 2020) on which a second predicted event (e.g., a transaction), associated with the second series of recurring events 125 (Series 2), is to occur and/or a second predicted amount (e.g., a transaction amount of $61.00) associated with the second predicted event.

In some implementations, the prediction system may determine a confidence score associated with a prediction and may include the confidence score in the predicted information. For example, the machine learning model may output a confidence score that is related to a prediction (e.g., a prediction of a future date and/or a predicted amount) associated with a series of recurring events. The confidence score may indicate a likelihood that the prediction is correct. For example, the confidence score may be within a range of 0 to 1 (e.g., the confidence score may be greater than or equal to 0 and less than or equal to 1), where a confidence score greater than or equal to 0.7 indicates that the prediction is highly likely (e.g., a percentage chance that the prediction is correct is greater than or equal to a first threshold percentage, such as 90%), a confidence score less than 0.7 and greater than or equal to 0.5 indicates that the prediction is likely (e.g., the percentage chance that the prediction is correct is greater than or equal to a second threshold percentage, such as 70%, and less than the first threshold percentage), a confidence score less than 0.5 and greater than or equal to 0.4 indicates that the prediction is possible (e.g., the percentage chance that the prediction is correct is greater than or equal to a third threshold percentage, such as 50%, and less than the second threshold percentage), a confidence score less than 0.4 and greater than or equal to 0.2 indicates that the prediction is unlikely (e.g., the percentage chance that the prediction is correct is greater than or equal to a fourth threshold percentage, such as 30%, and less than the third threshold percentage), and a confidence score less than 0.2 indicates that the prediction is highly unlikely (e.g., the percentage chance that the prediction is correct is greater than or equal to a fifth threshold percentage, such as 10%, and less than the fourth threshold percentage).

As further shown in FIG. 1C, and by reference number 145, the prediction system may store the predicted information (e.g., that was determined by the prediction system) in the account database associated with the account. For example, the prediction system may store, in the account database associated with Acct D, a first entry that includes the first prediction (e.g., that includes the first predicted event, the first predicted future date, the first predicted amount, and/or a first confidence score associated with the first prediction) and/or a second entry that includes the second prediction (e.g., that includes second predicted event, the second predicted future date, the second predicted amount, and/or a second confidence score associated with the second prediction).

In some implementations, the account may be associated with one or more conditions. For example, the one or more conditions may include, an over credit limit condition (e.g., the account has a current balance that is over a credit limit associated with the account), an over authorized user limit condition (e.g., the account has a current balance that is over an authorized user limit associated with the account), a card expired condition (e.g., the account is associated with a transaction card that is expired), a card lost condition (e.g., the account is associated with a transaction card that is reported as lost), a card stolen condition (e.g., the account is associated with a transaction card that is reported as stolen), a card locked condition (e.g., the account is associated with a transaction card that is locked), and/or a past due condition (e.g., the account is in a past due status), among other examples.

As further shown in FIG. 1C, and by reference number 150, the prediction system may determine that a condition, of the one or more conditions, is satisfied. For example, in some implementations, the account database may store status information associated with the account. The status information may indicate whether a transaction card associated with the account is expired, reported as lost, reported as stolen, or is locked, and/or whether the account is in a past due status. In some implementations, the prediction system may communicate with the account database to access and/or to obtain the status information. Accordingly, the prediction system may process the status information to determine that a condition, of the one or more conditions associated with the account, may be satisfied. For example, the prediction system may parse the status information to determine that at least one of the card expired condition, the card lost condition, the card stolen condition, the card locked condition, or the past due condition is satisfied.

As another example, the prediction system may determine that a current balance of the account is within a threshold amount of a limit (e.g., a credit limit or an authorized user limit) of the account. Accordingly, when the limit is a credit limit, the prediction system may determine that the over credit limit condition is satisfied. Alternatively, when the limit is an authorized user limit, the prediction system may determine that the over authorized user limit condition is satisfied.

In some implementations, the threshold amount may be based on a predicted amount (e.g., that the prediction system generated, as described herein in relation to FIG. 1C and reference number 140). For example, the prediction system may determine that the threshold amount is equal to the predicted amount or less than the predicted amount (e.g., a portion of the predicted amount, such as 95% of the predicted amount). As another example, the prediction system may determine that the threshold amount is equal to or less than an adjusted predicted amount (e.g., a modification of the prediction amount). The prediction system may determine the adjusted predicted amount based on the predicted amount and a confidence score associated with the predicted amount (e.g., that was output by the machine learning model in connection with the predicted amount). For example, the prediction system may determine the adjusted predicted amount based on the following formula: $p\_amt_{adj} = p\_amt \times (1+(1-c\_score))$, where $p\_amt_{adj}$ is the adjusted predicted amount, $p\_amt$ is the predicted amount, and $c\_score$ is the confidence score associated with the predicted amount. In this way, the adjusted predicted amount may be closer to the predicted amount when the confidence score associated with the predicted amount is high and the adjusted predicted amount may be closer to twice the predicted amount when the confidence score is low. Accordingly, the prediction system may determine the threshold amount is greater than or equal to the predicted amount and/or less than or equal to the adjusted predicted amount (e.g., which may not be greater than twice the predicted amount).

As further shown in FIG. 1C, and by reference number 155, the prediction system may determine that a current date is within a threshold number of days of a predicted future date of a predicted event associated with a series of recurring events (e.g., that was determined by the prediction system as described herein in relation to FIG. 1C and reference number 140). The current date may be within the threshold number of days of the predicted future date when a difference between the predicted future date and the current date is less than or equal to the threshold number of days.

In some implementations, the prediction system may determine the threshold number of days based on the condition, of the one or more conditions, that was satisfied. For example, as further shown in FIG. 1C, when the satisfied condition is the over credit limit condition, the over authorized user limit condition, the card expired condition, or the past due condition, the prediction system may determine the threshold number of days to be 2 days; when the satisfied condition is the card lost condition or the card stolen condition, the prediction system may determine threshold number of days to be 3 days; or when the satisfied condition is the card locked condition, the prediction system may determine the threshold number of days to be 1 day. Accordingly, when the current date is Jun. 30, 2020 (as shown in FIG. 1C), the prediction system may determine that the current date is within the threshold number of days of the first predicted future date of Jul. 1, 2020 (e.g., a difference of 1 day between the first predicted future date and the current date) when the satisfied condition is any of the example conditions described herein. Alternatively, the prediction system may determine that the current date (Jun. 30, 2020) is not within the threshold number of days of the second predicted future date of Jul. 5, 2020 (e.g., a difference of 5 days between the second predicted future date and the current date) when the satisfied condition is any of the example conditions described herein.

As further shown in FIG. 1C, and by reference number 160, the prediction system may transmit a notification (e.g., to a user device of a user of the account). For example, the prediction system may transmit the notification based on determining that the current date is within the threshold number of days of the predicted future date and/or that the condition, of one or more conditions associated with the account, is satisfied. The notification may include the predicted future date, information indicating that the current date is within the threshold number of days of the predicted future date, the predicted amount, information indicating the satisfied condition, and/or other information associated with the predicted event, such as information indicating a merchant associated with the predicted event. As further shown in FIG. 1C, and by reference number 165, the user device (or another device) that receives the notification may present the notification (e.g., via a display of the user device).

In some implementations, the notification may enable an action to be performed (e.g., in connection with the account). For example, the notification may include information for presentation of one or more input elements (e.g., to be presented by the user device) that enable the action to be performed. An input element, as shown in FIG. 1C, may be a button or other interactive element that is presented by the user device.

For example, an input element (e.g., a "pay down balance" button shown in FIG. 1C) may enable a transfer (e.g., from a payment account to the account) to reduce the current balance of the account. The user may select the input element and may be presented with one or more options, such as one or more options to transfer a fixed amount (e.g., $50, $100, $200, or $500, among other examples); a custom amount (e.g., the user enters the amount to transfer); a percentage (e.g., 15%, 25%, or 50%, among other examples) of the current balance, the credit limit, or the authorized user limit; or a variable amount (e.g., that equals the predicted amount; the adjusted predicted amount; or the predicted amount minus a difference between a limit of the account, such as the credit limit of the account or the authorized user limit of the account, and the current balance of the account; among other examples). Additionally, or alternatively, the user device may present an option to convert one or more transactions (e.g., one or more transactions having the highest amounts of all transactions due on the account) to an installment loan to remove those one or more transactions from the account. Accordingly, the user may select an option, of the one or more options, and the prediction system and/or the user device may cause the transfer and/or conversion to be executed. For example, the prediction system and/or the user device may send a message to a device associated with the payment account to cause the device to transfer an amount associated with the user's selection from the payment account to the account, to convert one or more transactions to an installment loan, or the like. In this way, the prediction system and/or the user device reduce a current balance of the account and/or remove the account from a past due status, which reduces a likelihood that the predicted event will be declined on the predicted future date for the predicted amount.

As another example, an input element (e.g., a "request credit limit increase" button shown in FIG. 1C) may enable a request to increase a limit (e.g., the credit limit associated with the account or the authorized user limit) associated with the account. The user may select the input element and may be presented with one or more options, such as one or more options to increase the limit by a fixed amount (e.g., $50, $100, $200, or $500, among other examples); a custom amount (e.g., the user enters the amount to increase the limit); a percentage (e.g., 15%, 25%, or 50%, among other examples) of the limit; or a variable amount (e.g., that equals the predicted amount; the adjusted predicted amount; or the predicted amount minus a difference between the limit of the account and the current balance of the account, among other examples). Accordingly, the user may select an option, of the one or more options, and the prediction system and/or the user device may cause the request to be sent to a device associated with the account to evaluate the request. In some implementations, this may cause the limit associated with the account to be increased. In this way, the prediction system and/or the user device reduces a likelihood that the predicted event will be declined on the predicted future date for the predicted amount.

In another example, an input element may enable a request to cancel a service. The user may select the input element and may be presented with one or more options, such as one or more options to cancel a service associated with a series of recurring events associated with the account. For example, when the account is Acct D, the one or more options may include an option to cancel a service provided by Content Provider A that is associated with the first series of recurring events 120 (shown as Series 1 in FIG. 1C) and/or an option to cancel a service provided by Phone Company B associated with the second series of recurring events 125 (shown as Series 2 in FIG. 1C). Accordingly, the user may select an option, of the one or more options, and the prediction system and/or the user device may cause the user device to load a cancellation webpage associated with cancelling the service, to automatically call a phone number associated with cancelling the service, and/or to automatically send a cancellation message to an electronic message account associated with the service, among other examples. In this way, the prediction system and/or the user device reduce a likelihood that the predicted event will occur and thereby cause the account to avoid a declined transaction event.

In an additional example, an input element may enable an indication that the predicted event is not associated with recurrence. The user may select the input element and, accordingly, the prediction system may determine to not transmit additional notifications regarding the predicted event. In some implementations, the prediction system may retrain the machine learning model based on the indication that the predicted event is not associated with recurrence. In this way, the prediction system improves the predictive capabilities of the machine learning model.

As another example, an input element may enable one or more card services actions. The user may select the input element and may be presented with one or more options, such as one or more options for activation of a new card that is associated with the account, establishment of a virtual card number that is associated with the account, and/or unlocking a card that is associated with the account. Accordingly, the user may select an option, of the one or more options, and the prediction system and/or the user device may cause a new card that is associated with the account to be activated, a virtual card number that is associated with the account to be established, and/or a card that is associated with the account to be unlocked. For example, the prediction system and/or the user device may send a message to a device associated with the account to cause the new card to be activated, the virtual card number to be established, and/or the card to be unlocked. In this way, the prediction system and/or the user device increase a likelihood that a valid and/or active card will be available to facilitate the predicted event and thereby cause the account to avoid a declined transaction event.

As indicated above, FIGS. 1A-1C are provided as an example. Other examples may differ from what is described with regard to FIGS. 1A-1C.

Figure 2:
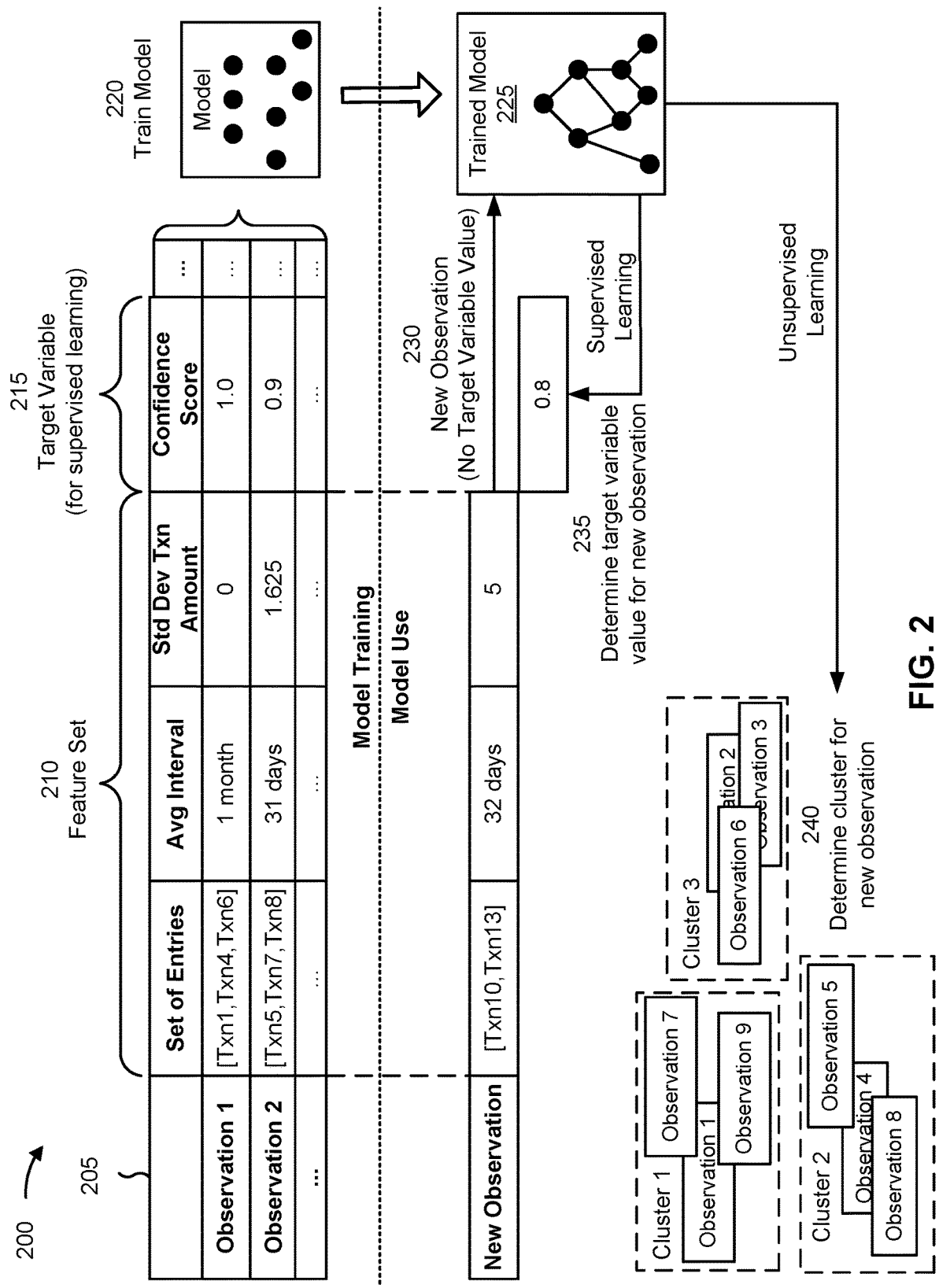
FIG. 2 is a diagram illustrating an example of training and using a machine learning model in connection with transmitting proactive notifications based on machine learning model predictions.

FIG. 2 is a diagram illustrating an example 200 of training and using a machine learning model in connection with transmitting proactive notifications based on machine learning model predictions. The machine learning model training and usage described herein may be performed using a machine learning system. The machine learning system may include or may be included in a computing device, a server, a cloud computing environment, or the like, such as the prediction system and/or the user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the historical event database (e.g., that is included in the storage system), as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the historical event database. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a set of entries (e.g., that are associated with a series of recurring events), a second feature of an average interval of time (e.g., between events included in the series of recurring events), a third feature of a standard deviation of the average interval time, and so on. As shown, for a first observation, the first feature may have a value of [Txn1, Txn4, Txn6], the second feature may have a value of 1 month, the third feature may have a value of 0, and so on. These features and feature values are provided as examples and may differ in other examples. For example, the feature set may include one or more of the following features: an average transaction amount associated with the series of recurring events, a standard deviation for the average transaction amount, and/or other statistical information associated with the series of recurring events.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a confidence score (e.g., that indicates that the set of entries is associated with a series of recurring events), which has a value of 1.0 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of [Txn10, Txn13], a second feature of 32 days, a third feature of 5 (days), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 0.8 for the target variable of a confidence score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first automated action may include, for example, determining whether a condition of an account associated with the new observation is satisfied.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a highly likely prediction), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determining whether a set of entries is associated with a series of recurring events. The machine learning system enables recognition and/or identification of tens, hundreds, thousands, or millions of features and/or feature values for tens, hundreds, thousands, or millions of observations, thereby increasing accuracy and consistency and reducing delay associated with determining whether a set of entries is associated with a series of recurring events relative to requiring computing resources to be allocated for tens, hundreds, or thousands of operators to manually determining whether a set of entries is associated with a series of recurring events using the features or feature values. While some implementations described herein in relation to FIG. 2 are directed to determining whether a set of entries is associated with a series of recurring events, the description provided herein in relation to FIG. 2 applies to training and applying a machine learning model to identify a series of recurring events and/or to generate predicted information (e.g., that includes a predicted future date and/or a predicted amount of a predicted event associated with a series of recurring events), as described herein in relation to FIGS. 1A-1C.

As indicated above, FIG. 2 is provided as an example. Other examples may differ from what is described in connection with FIG. 2.

Figure 3:
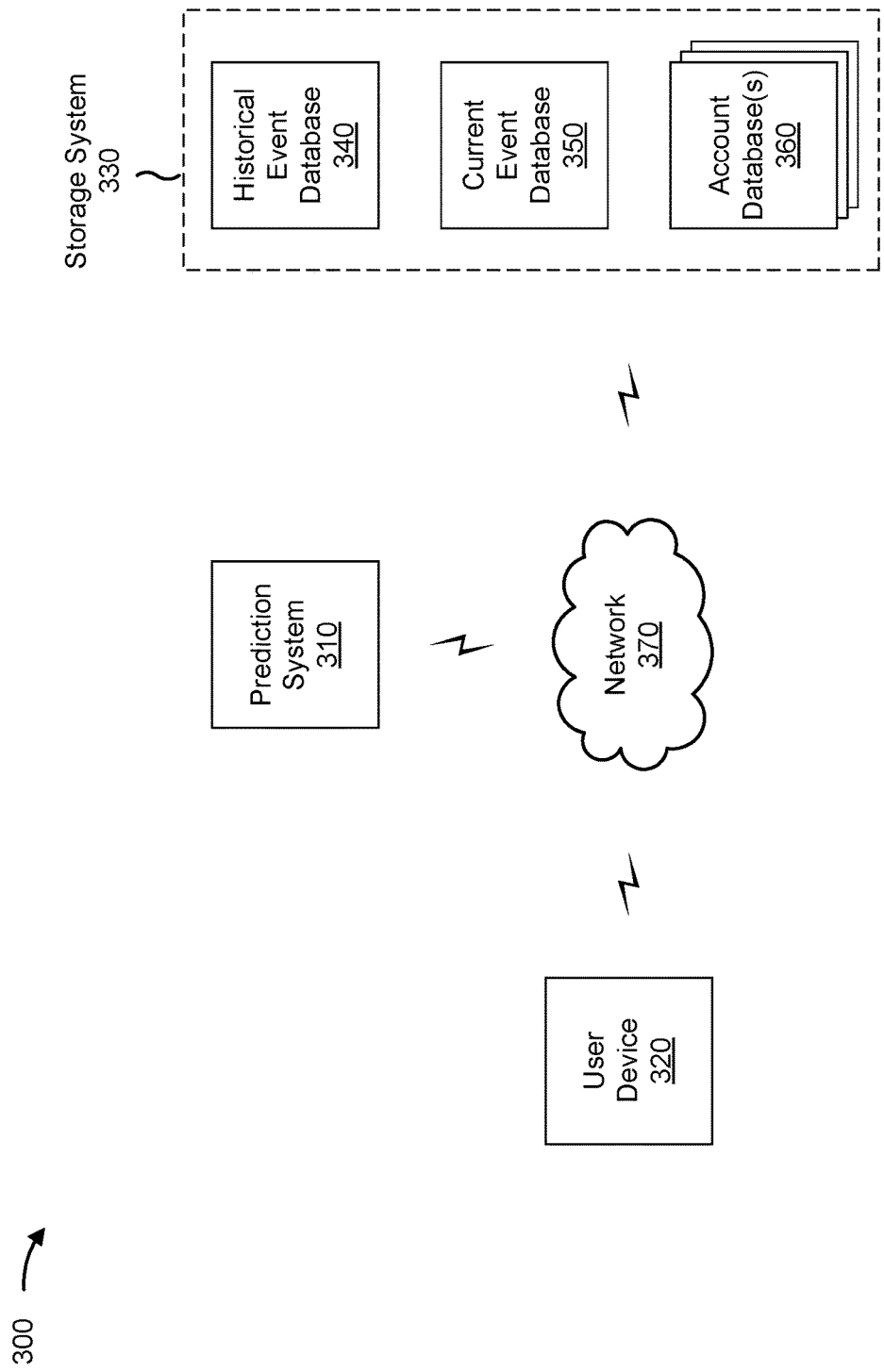
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a prediction system 310, a user device 320, a storage system 330 (e.g., that includes a historical event database 340, a current event database 350, and/or one or more account databases 360), and a network 370. Devices of environment 300 may interconnect via wired connections, wireless connections, or a combination of wired and wireless connections.

The prediction system 310 includes one or more devices capable of receiving, generating, storing, processing, and/or providing information associated with transmitting proactive notifications based on machine learning model predictions, as described elsewhere herein. The prediction system 310 may include a communication device and/or a computing device. For example, the prediction system 310 may include a server, an application server, a client server, a web server, a database server, a host server, a proxy server, a virtual server (e.g., executing on computing hardware), a device that includes computing hardware used in a cloud computing environment, or a similar type of device. The prediction system 310 may communicate with one or more other devices of environment 300, as described elsewhere herein.

The user device 320 includes one or more devices capable of receiving, generating, storing, processing, and/or providing information associated with transmitting proactive notifications based on machine learning model predictions, as described elsewhere herein. The user device 320 may include a communication device and/or a computing device. For example, the user device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 320 may communicate with one or more other devices of environment 300, as described elsewhere herein.

The storage system 330 includes one or more devices capable of receiving, generating, storing, processing, and/or providing information associated with transmitting proactive notifications based on machine learning model predictions, as described elsewhere herein. The storage system 330 may include a communication device and/or a computing device. For example, the storage system 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the storage system 330 may include the historical event database 340, the current event database 350, and/or the one or more account databases 360. The storage system 330 may communicate with one or more other devices of environment 300, as described elsewhere herein.

The network 370 includes one or more wired and/or wireless networks. For example, the network 370 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 370 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
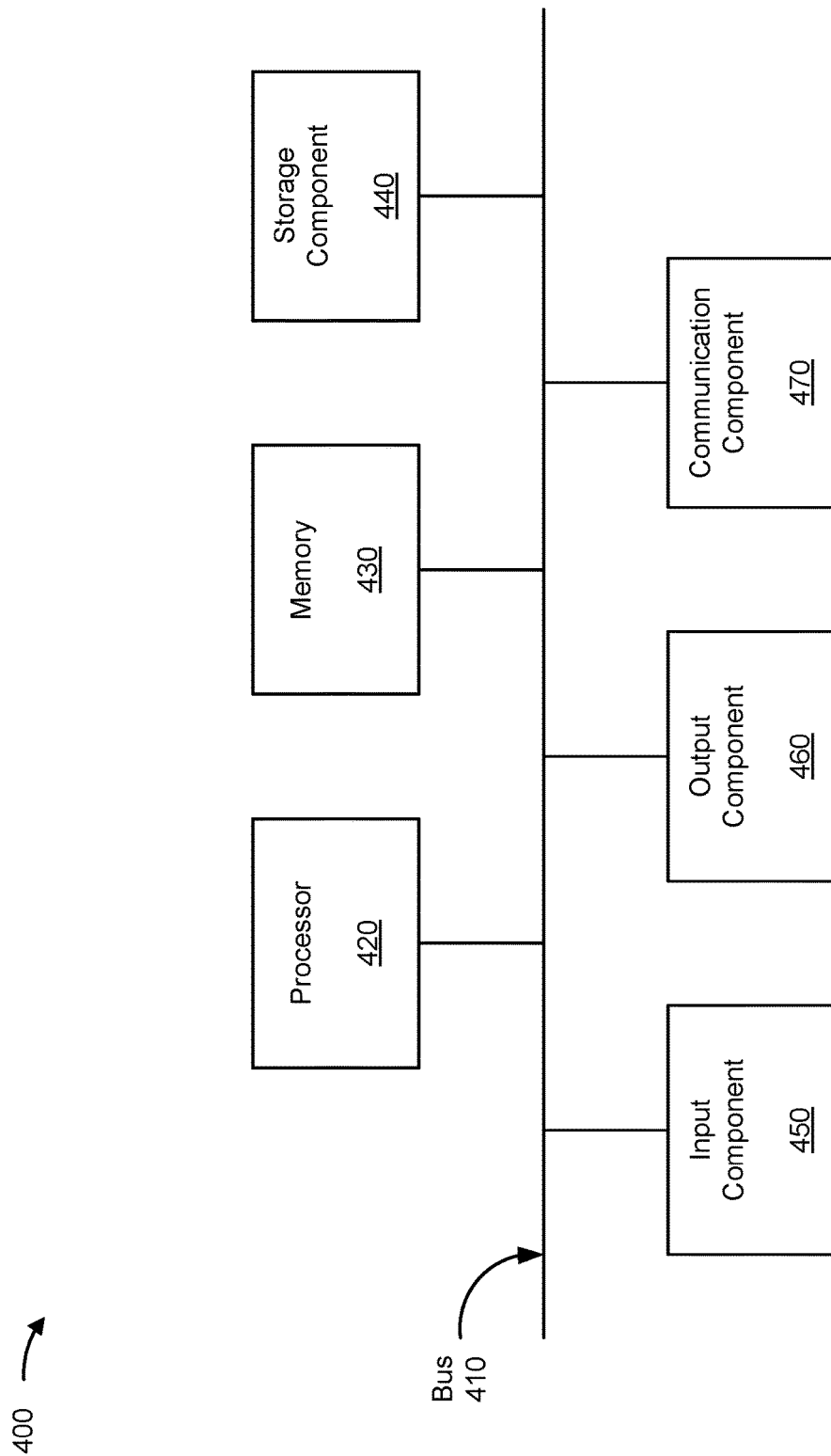
FIG. 4 is a diagram of example components of one or more devices of FIG. 3.

FIG. 4 is a diagram of example components of a device 400, which may correspond to the prediction system 310, the user device 320, and/or the storage system 330. In some implementations, the prediction system 310, the user device 320, and/or the storage system 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
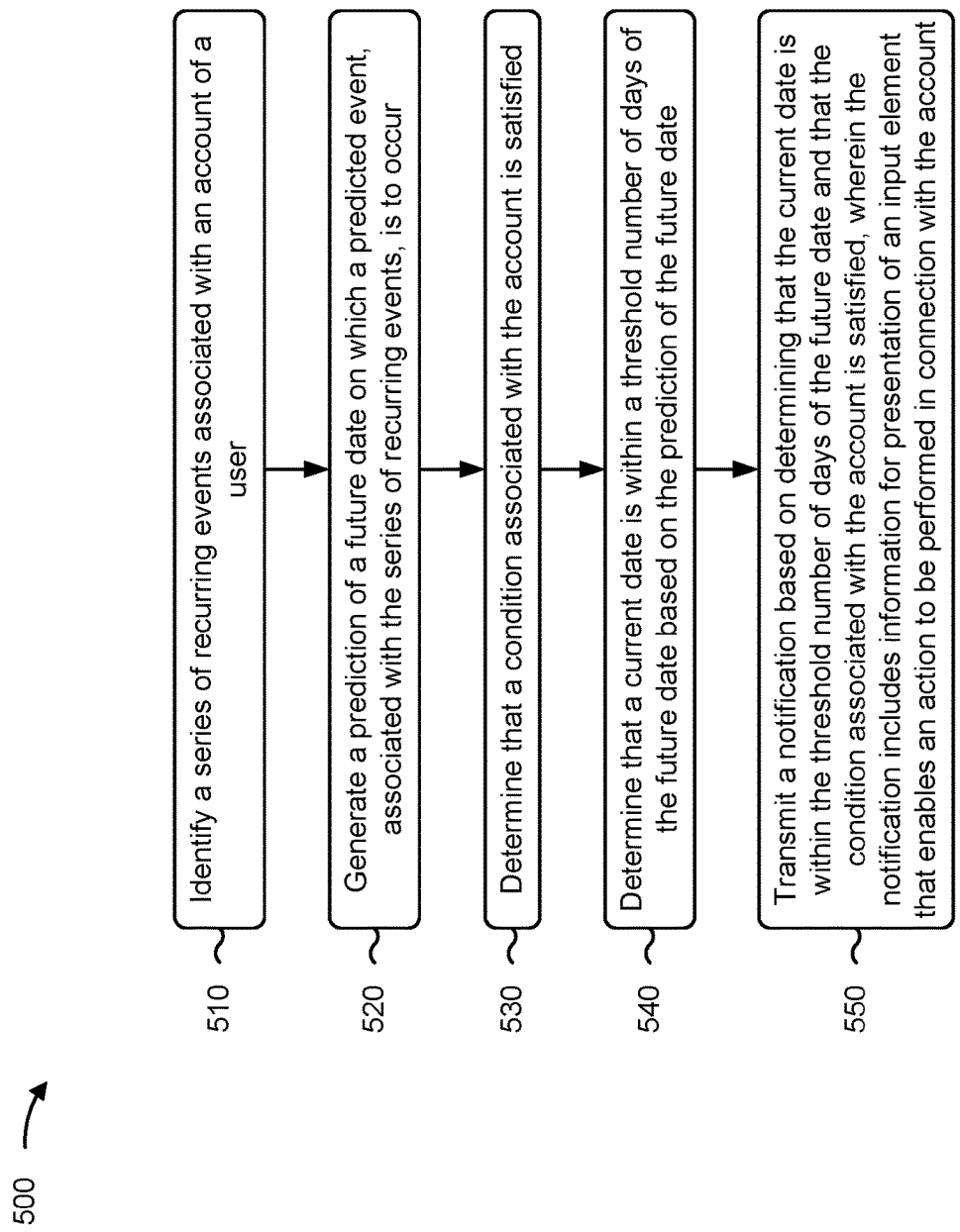
FIG. 5 is a flowchart of an example process relating to transmitting proactive notifications based on machine learning model predictions.

FIG. 5 is a flowchart of an example process 500 associated with transmitting proactive notifications based on machine learning model predictions. In some implementations, one or more process blocks of FIG. 5 may be performed by a system (e.g., prediction system 310). In some implementations, one or more process blocks of FIG. 5 may be performed by another device or a group of devices separate from or including the system, such as a user device (e.g., user device 320) and/or a storage system (e.g., storage system 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include identifying a series of recurring events associated with an account of a user (block 510). As further shown in FIG. 5, process 500 may include generating a prediction of a future date on which a predicted event, associated with the series of recurring events, is to occur (block 520). As further shown in FIG. 5, process 500 may include determining that a condition associated with the account is satisfied (block 530). As further shown in FIG. 5, process 500 may include determining that a current date is within a threshold number of days of the future date based on the prediction of the future date (block 540). As further shown in FIG. 5, process 500 may include transmitting, to a user device associated with the user, a notification based on determining that the current date is within the threshold number of days of the future date and that the condition associated with the account is satisfied, wherein the notification includes information for presentation of an input element that enables an action to be performed in connection with the account (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for transmitting proactive notifications based on machine learning model predictions, the system comprising:
   one or more memories; and
   one or more processors, coupled to the one or more memories, configured to:
      train a machine learning model based on information included in one or more entries, that are respectively associated with one or more reoccurring events, of historical data;
      identify, using the machine learning model, a series of recurring events associated with an account;
      generate, using the machine learning model, a prediction of a future date on which a predicted event, of the series of recurring events, is to occur,
         wherein the machine learning model processes a set of entries from the series of recurring events to generate the prediction of the future date on which the predicted event associated with the series of recurring events is to occur and output a confidence score in connection with the predicted event;
      determine, using the machine learning model, a predicted amount of the predicted event in connection with the future date;
      determine that a current date is within a threshold number of days of the future date based on the prediction of the future date;
      determine that a current balance, associated with the account, is within a threshold amount of a limit associated with the account,
         wherein the threshold amount is based on the predicted amount associated with the predicted event;
      transmit, to a user device, a notification based on determining that the current date is within the threshold number of days of the future date, the confidence score, and that the current balance is within the threshold amount of the limit associated with the account,
         wherein the notification includes information for presentation of one or more input elements, to be presented by the user device; receive an indication from the user device based on the information;
      selectively retrain the machine learning model; and
      perform an action based on the indication,
         wherein the action includes one or more of:
            cause a transfer to occur to reduce the current balance of the account based on the predicted amount,
            cause the limit associated with the account to be increased,
            cause the user device to load a cancelation webpage, or
            cause one or more card service actions to occur.

2. The system of claim 1, wherein the machine learning model identifies the series of recurring events based on a feature set that includes at least one of:
   an average time between events included in the series of recurring events,
   a standard deviation determined for times between events included in the series of recurring events,
   an average transaction amount associated with the series of recurring events, or
   a standard deviation determined for transaction amounts of the series of recurring events.

3. The system of claim 1, wherein the threshold amount is less than the predicted amount associated with the predicted event.

4. The system of claim 1, wherein the threshold amount is less than an adjusted predicted amount that is determined based on the predicted amount, associated with the predicted event.

5. The system of claim 1, wherein the notification indicates the future date and a merchant associated with the predicted event.

6. The system of claim 1, wherein an amount of the transfer is based on the predicted amount associated with the predicted event.

7. The system of claim 1, wherein the transfer to reduce the current balance of the account is a transfer of a percentage of the current balance from a payment account to the account.

8. The system of claim 1, wherein the system further identifies another series of recurring events associated with another account of another user.

9. A method for transmitting proactive notifications based on one or more machine learning predictions, comprising:
training, by a system a machine learning model based on information included in one or more entries, that are respectively associated with one or more reoccurring events, of historical data;
identifying, by the system and using the machine learning model, a series of recurring events associated with an account of a user;
generating, by the system and using the machine learning model, a prediction of a future date on which a predicted event, associated with the series of recurring events, is to occur,
wherein the machine learning model processes a set of entries from the series of recurring events to generate the prediction of the future date on which the predicted event associated with the series of recurring events is to occur;
determining, by the system, that a condition of the account is satisfied,
wherein the condition is associated with a status of a card of the account,
wherein the condition is that a current balance, of the account, is within a threshold amount of a credit limit associated with the account, and
wherein the threshold amount is based on a predicted amount associated with the predicted event; determining, by the system, a threshold number of days based on the condition;
determining, by the system, that a current date is within the threshold number of days of the future date based on the prediction of the future date;
transmitting, by the system and to a user device associated with the user, a notification based on determining that the current date is within the threshold number of days of the future date and that the condition of the account is satisfied,
wherein the notification includes information for presentation of an input element that enables an action to be performed in connection with the account,
receiving, by the system, an indication from the user device based on the information;
selectively retraining, by the system, the machine learning model; and
performing, by the system, the action based on the indication,
wherein the action includes one or more of the following:
cause a transfer to occur to reduce the current balance of the account based on the predicted amount,
cause the limit associated with the account to be increased,
cause the user device to load a cancelation webpage, or
cause one or more card service actions to occur.

10. The method of claim 9, wherein the condition is that a current balance, of the account, is within a threshold amount of an authorized user limit associated with the account, wherein the threshold amount is based on a predicted amount associated with the predicted event; and
wherein the action includes an increase in the authorized user limit.

11. The method of claim 9, wherein the condition is that the account is associated with the card that is expired, reported as lost, or reported as stolen; and
wherein causing one or more card service actions to occur includes at least one of activation of a new card or establishment of a virtual card number associated with the account.

12. The method of claim 9, wherein the condition is that the account is associated with the card that is locked; and
wherein causing one or more card service actions to occur includes unlocking the card.

13. The method of claim 9, wherein the threshold number of days is based on the condition.

14. The method of claim 9, wherein the transfer to reduce the current balance of the account is a transfer of a percentage of the current balance from a payment account to the account.

15. The method of claim 9, wherein the account is a checking account.

16. A non-transitory computer-readable medium storing a set of instructions for transmitting proactive notifications based on one or more predictions, the set of instructions comprising:
one or more instructions that, when executed by one or more processors of a system, cause the system to:
train a machine learning model based on information included in one or more entries, that are respectively associated with one or more reoccurring events, of historical data;
identify, using the machine learning model, a series of recurring events associated with an account of a user;
generate, using the machine learning model, a prediction of a future date on which a predicted event, associated with the series of recurring events, is to occur,
wherein the machine learning model processes a set of entries from the series of recurring events to generate the prediction of the future date on which the predicted event associated with the series of recurring events is to occur; determine that a condition of the account is satisfied,
wherein the condition is associated with a status of a card of the account, and
wherein the condition is that a current balance, associated with the account, is within a threshold amount of a limit associated with the account,
wherein the threshold amount is based on a predicted amount associated with the predicted event;
determine a threshold number of days based on the condition;

determine that a current date is within the threshold number of days of the future date based on the prediction of the future date;

transmit, to a user device associated with the user, a notification based on determining that the current date is within the threshold number of days of the future date and that the condition of the account is satisfied, wherein the notification includes information for presentation of an input element that enables an action to be performed in connection with the account,
wherein the action includes a transfer to reduce the current balance of the account based on the predicted event;

receive an indication from the user device based on the information;

selectively retrain the machine learning model; and perform the action based on the indication,
wherein the action includes one or more of:
cause a transfer to occur to reduce the current balance of the account based on the predicted amount,
cause the limit associated with the account to be increased,
cause the user device to load a cancelation webpage, or
cause one or more card service actions to occur.

17. The non-transitory computer-readable medium of claim 16, wherein the condition is that the account is associated with a card that is expired, reported as lost, or reported as stolen; and
wherein cause more card service actions to occur includes at least one of activation of a new card or establishment of a virtual card number associated with the account.

18. The non-transitory computer-readable medium of claim 16, wherein the condition is that the account is associated with a card that is locked; and
wherein the one or more instructions further cause the system to unlock the card.

19. The non-transitory computer-readable medium of claim 16, wherein the condition is that the account is in a past due status; and
wherein the action includes a transfer to remove the account from the past due status.

20. The non-transitory computer-readable medium of claim 16, wherein the series of recurring events occurs:
daily,
weekly,
monthly,
semiannually, or
annually.

* * * * *